Feb. 11, 1958  W. W. LANDSIEDEL  2,823,343
MOTOR CONTROL FOR ADDING AND COMPUTING MACHINES
Original Filed Dec. 2, 1948  3 Sheets-Sheet 1
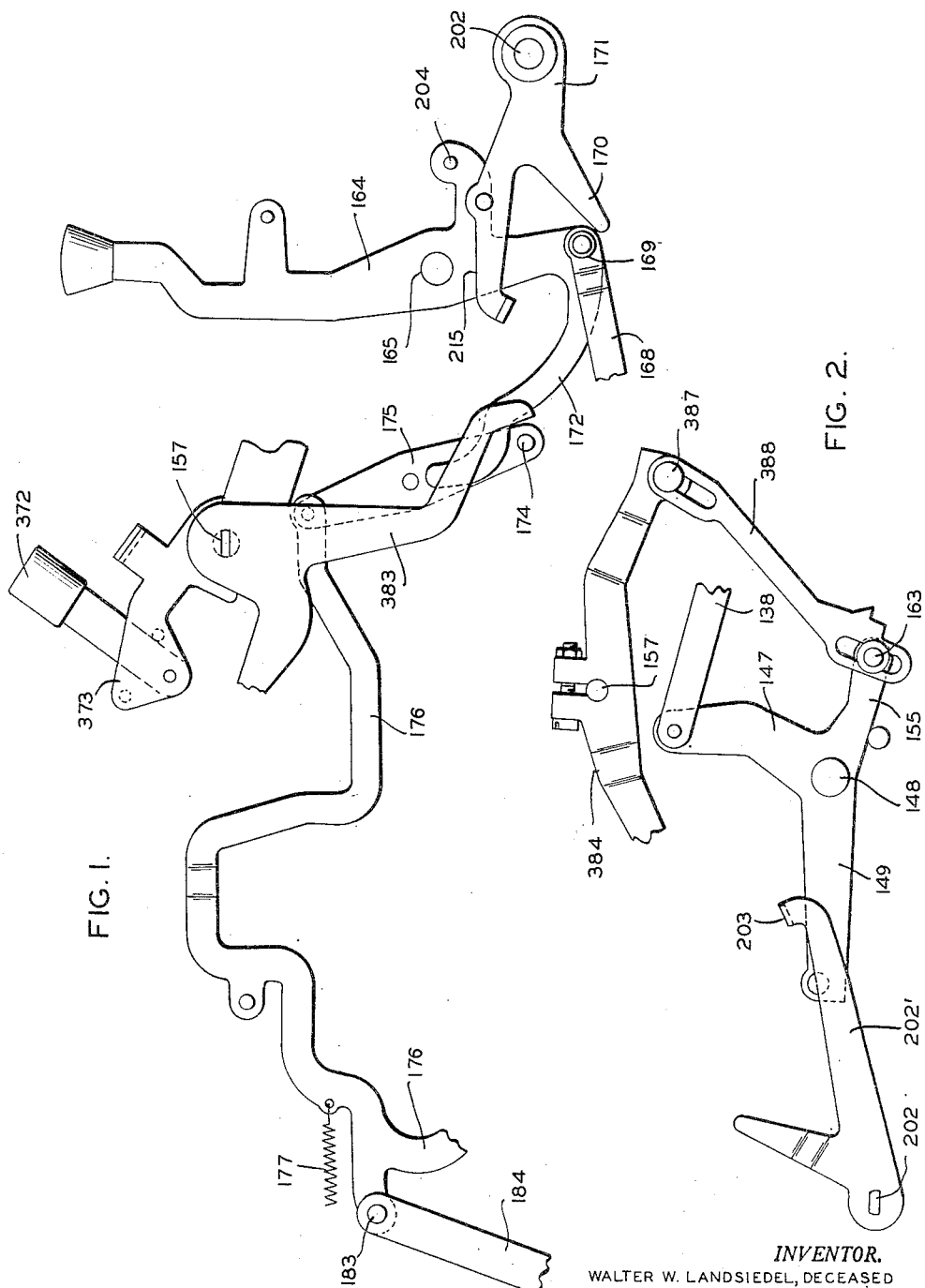
INVENTOR.
WALTER W. LANDSIEDEL, DECEASED
FLORENCE E. LANDSIEDEL, EXECUTRIX
BY George V. Eltgroth
Jh L Sterling
ATTORNEYS.

Feb. 11, 1958 W. W. LANDSIEDEL 2,823,343
MOTOR CONTROL FOR ADDING AND COMPUTING MACHINES
Original Filed Dec. 2, 1948 3 Sheets-Sheet 2

INVENTOR,
WALTER W. LANDSIEDEL, DEC'D.
FLORENCE E. LANDSIEDEL, EXECX

BY George V. Eltgroth
John L. Sterling
ATTORNEYS.

United States Patent Office 2,823,343
Patented Feb. 11, 1958

2,823,343

MOTOR CONTROL FOR ADDING AND COMPUTING MACHINES

Walter W. Landsiedel, deceased, late of Elmira, N. Y., by Florence E. Landsiedel, executrix, Cincinnati, Ohio, assignor, by mesne assignments, to Sperry Rand Corporation, New York, N. Y., a corporation of Delaware Original application December 2, 1948, Serial No. 63,614. Divided and this application January 11, 1954, Serial No. 403,372

3 Claims. (Cl. 318—325)

This invention relates to computing machines of the ten-key type and more particularly to a printing calculator upon which problems in multiplication and division may be performed and which prints upon a record sheet all the essential factors of such problems.

The application is a division of an application of Walter W. Landsiedel Serial Number 63,164, filed December 2, 1948, and entitled "Adding and Computing Machines," issued September 7, 1954, as U. S. Patent No. 2,688,439 and relates especially to mechanism whereby there is obtained a relatively higher cycling speed during multiplying and dividing operations than is provided for in adding and subtracting operations.

The machine of the present invention is an improvement upon the machine disclosed in Patents Nos. 2,203,336, issued January 4, 1940; 2,229,980, issued January 28, 1941; 2,237,881, issued April 8, 1941, and 2,255,622, issued September 9, 1941, all in the name of Walter W. Landsiedel. In these patents, various mechanisms for effecting multiplication and division are disclosed, whereas the present application discloses new and improved mechanism to provide more efficient operation of the machine.

The main object of the invention is to provide simple, and efficient means whereby the drive motor of the machine will operate at higher speeds during multiplying and dividing operations than during adding and subtracting operations.

A further object of the invention is to provide simple, and efficient means whereby, upon the initiation of either multiplying or dividing operations the speed of the motor is automatically increased.

In brief and general terms, the invention includes the combination of high speed universal type drive motor, motor control switch contacts, a centrifugal governor operated by said motor, means connecting the governor with the switch contacts to open said contacts, resistance means associated with said last mentioned means to resist the operation of the governor and prevent the opening of the contacts below a predetermined speed of the motor, an element actuated when a special operation is to take place, a second resisting means, and means made effective when said element is actuated to add the resistance of the second resistance means to that of the first in resisting the opening of the contacts whereby a higher speed is obtained before said switch is opened.

The present preferred form which the invention may assume is shown in the drawings, in which, Fig. 1 shows a partial side elevation of the machine and the linkage which starts the motor when a multiplication operation is initiated and controls the speed thereof;

Fig. 2 is a partial side elevation showing the linkage operated by the division key to start and to control the motor when division is initiated;

Figure 3:
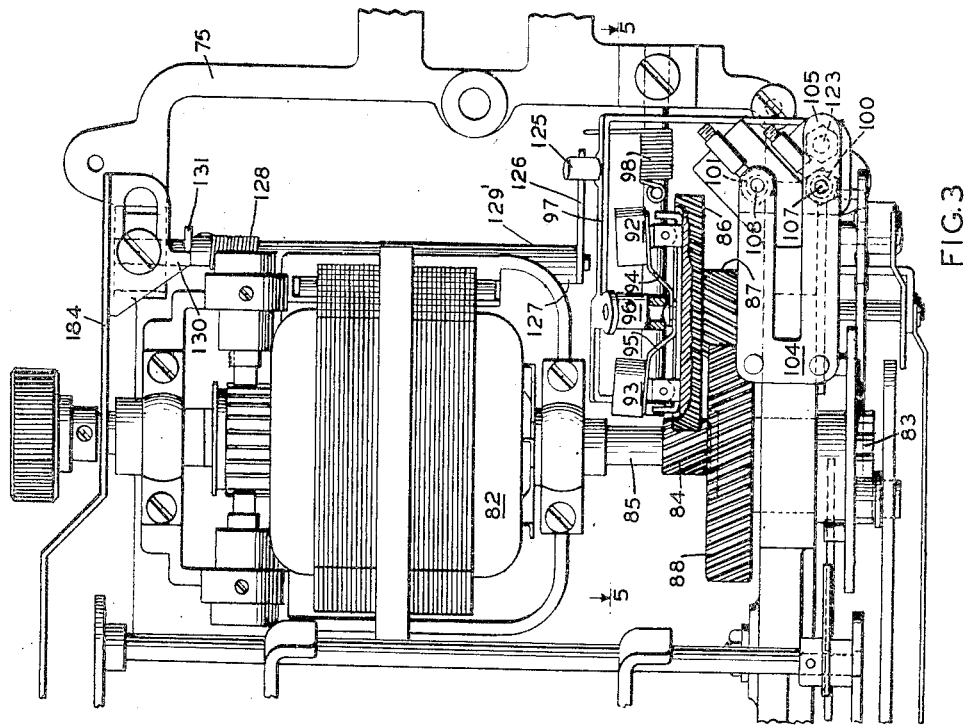
Fig. 3 is a detail plan view of the dual speed motor drive.

Referring now merely to the specific preferred form of the invention illustrated in the drawings, an electric motor 82 is secured to the base plate 75, in a position to drive a ratchet disc 83 (which is an element of a one-revolution clutch) through speed reduction gearing. This gearing comprises a fixed pinion 84 on the armature shaft 85, which meshes with a gear 86 fast with a pinion 87. The pinion 87 further meshes with a gear 88 securely fastened on a shaft 90 on which said driven member or ratchet disc 83 is secured.

Means will now be considered for controlling the speed of the electric motor 82 at either of two distinct speeds in order to drive the ratchet disc 83 at a relatively fast rate for multiplication and division, and at a substantially slower rate for addition and subtraction. It has been necessary to employ a relatively slower speed for the addition and subtraction operations because the adding and printing racks require additional time to get settled after rebounding whenever the accumulator wheels are thrown into mesh. Division and multiplication, on the other hand contain several non-add and non-print operations which permit higher rates of cycling speeds. In order to provide dual rates of operating speeds of the electric motor 82, there is attached to the gear 86 a governor comprising two swingable fly weights 92 and 93 which are adapted upon attaining a predetermined rate of rotation, and through a pair of pivotally mounted links 94 and 95 (see also Figs. 5 and 6) to urge a stud 96 outwardly from the gear 86. The stud 96 is securely fastened to a rotatable bail member 97. The bail member 97 is normally urged in an anti-clockwise direction by a spring 98, thereby retaining the fly weights 92 and 93 in their contracted position.

Figure 4:
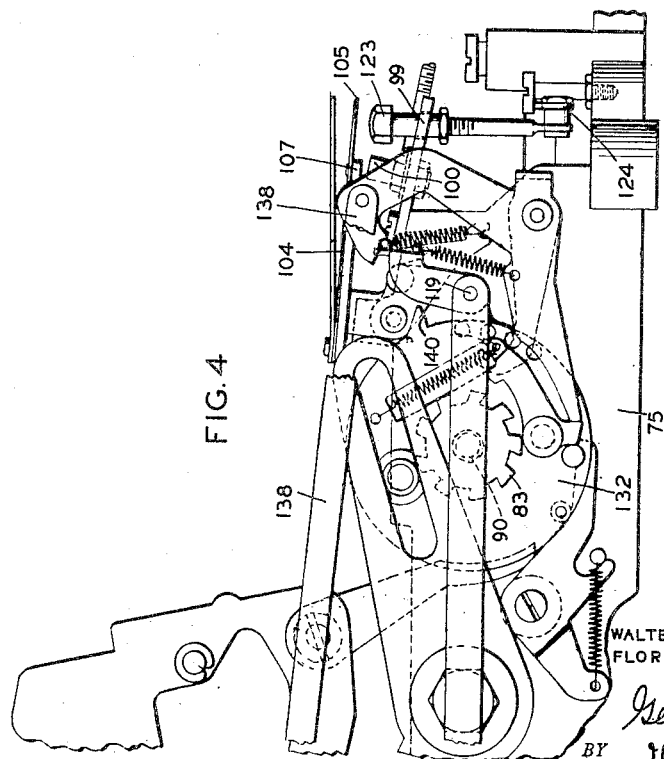
Fig. 4 is a right-hand side elevation of the drive.

The motor is controlled by a switch including J-shaped spring contact blades 104 and a fixed contact plate 99, secured to the top of the base wall 103. The plate 99 carries two contacts 100 and 101 which are adapted to cooperate with contacts 107 and 108 on blades 104. These contacts at the proper times are to be connected with a pair of corresponding contacts 107 and 108 on a J-shaped conductor plate 104. The contacts 107 and 108 are connected to and disconnected from the fixed contacts 100 and 101 by slightly rotating the plate 104 in up and down directions. The detail manner in which this movement is achieved is clearly described in the parent application and for the purposes of this application it need only be said that the contacts are closed by a movement to the left of link 138 shown in Figs. 2 and 4 and are opened by the engagement of the stud 119 with the nose 140 of the plate 132.

Figure 5:
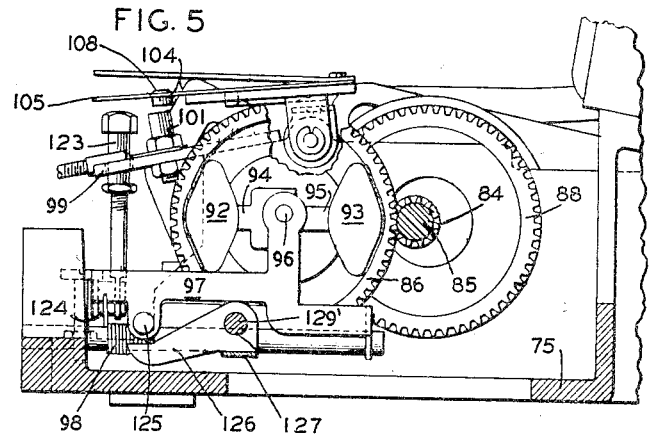
Fig. 5 is a cross section taken on the line 5—5 of Fig. 3.
Figure 6:
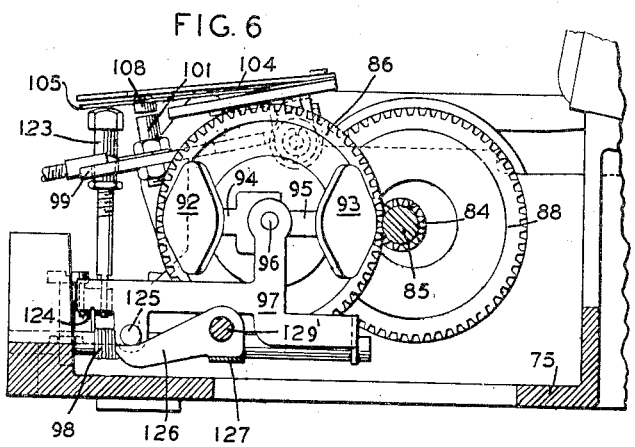
Fig. 6 is a view similar to Fig. 5 but showing the parts in position for high speed operation.

Beneath the projecting extremity of the flexible arm 105 of the J-shaped contact blade 104 there is positioned a reciprocating pusher rod 123. The upper end of this rod can be adjusted to lie exactly at the level of the arm 105 when said arm is in contact with its cooperating contact 100. Therefore a slight vertical rise of the rod 123 will then cause a separation of the contacts 100 and 107. The lower extremity of the rod 123 is pivotally secured to an arm 124 of the rockable bail member 97. A short stud 125 (Figs. 3, 5, and 6) projects from the face of bail 97 and is moved downward therewith as the bail is moved downwardly by the action of the fly weights 92, 93. An arm 126 is disposed below the stud 125. This arm 126 is fixed to the end of a bail 127 which is pivoted on a fixed shaft 129' (Fig. 3). A loading spring 128 is coiled around the shaft 129' and has one end fixed to the shaft 129' and the other pressing against bail 127 and normally tending to urge the arm 126 clockwise (Fig. 5) into contact with stud 125. The end of the bail 127 opposite the arm 126 is provided with a finger 131 which extends upwardly and lies in the path of an ear 130 on the flat rear end of the link 184. This link is moved either by the multiply lever 164 (Fig. 1) or by the division lever 372. When these levers are not operated, the link 184 is disposed with its flat end in the rearmost position as shown in Fig. 3. In this position, the ear 130 presses the finger 131 against the resistance of spring 128 and moves the arm 126 counterclockwise to its lowermost position out of contact with the stud 125 as seen in Fig. 5.

With this position of the parts, and with the multiply lever or division lever not operated, the operation of any other key to start the motor will close the contacts of the motor and cause it to start and revolve the flyweights which will tend to turn the bail 97 against the resistance of spring 98. Depending upon the resistance of this spring, the bail will be moved, at a certain speed of the motor, to raise rod 123 and open the motor circuit. The motor will then slow down thus allowing the spring 98 to force bail 97 back to normal and close the contacts of the motor. Therefore it will be clear that under these conditions the motor can never exceed a predetermined speed before its contacts are opened. This action is a repetitious one to keep the motor speed down below a definite amount for ordinary operations, except such as multiplication and division operations.

However when these latter operations are brought into play, the multiply lever 164 or the division lever 372 is operated and moves the link 184 forwardly. This action removes the ear from contact with the finger 131 whereby the full strength of the spring 128 is exerted on bail 127 to move the arm 126 clockwise into contact with the stud 125. This contact thus will add the resistance of the spring 128 to the already established resistance of spring 98 to the downward movement of the bail 97 so that it will allow the motor to achieve a higher speed before the flyweights can overcome the resistance of the two springs and thus force the bail 97 down enough to open the motor contacts and slow it up. The motor being of the high speed universal type will accelerate rapidly once its contacts are closed. By opening its contacts earlier its speed is reduced and by retarding the opening of its contacts the motor speed will rise. Thus the resistance of one spring 98 is sufficient to insure the earlier opening of the motor contacts whereas the added load of the spring 128 under control of the multiplication or division key will insure a later opening of the contacts so that the motor can reach a higher speed. Therefore for ordinary operations a slow motor speed is achieved and for multiplication and division operations a higher speed is achieved.

Reference is made to Figs. 1 and 2 which are partial side elevations of the machine corresponding respectively to Figs. 2 and 3 of the parent case. Briefly considered, and in accordance with the description in said parent case, the rearward movement of the multiply lever 164 around its pivot axis 165 causes its lower end to move forwardly and press a roller 169 thereon against the lower arm 170 of a two arm lever 171 which has another arm 215. The lever 171 is fixed to a shaft 202, which extends across the front of the machine, and has fixed to its other end an arm 202' with a bent ear 203 on its outer end (Fig. 2). When the lever 171 is pressed counterclockwise as in Fig. 1, the arm 202' will be moved clockwise (Fig. 2) and the ear 203 will press down on the arm 149 of a three-armed element having other arms 147 and 155, and pivoted on an axis 148. This will rotate the three-armed element and move the link 138, connected to the upper end of arm 147 to the left (Fig. 2) and close the motor contacts and start the motor in the manner clearly described in the parent application.

The same rearward movement of the multiply lever 164 will move a cam arm 172 on its lower end forwardly to engage a stud 174 on the lower end of a lever 175 the upper end of which is connected to one end of a long back-space link 176 which is pivotally connected at 183 at its rear end to the previously mentioned link 184. It is therefore clear that the rearward movement of the multiply lever 164 will not only start the motor but will also introduce the resistance of the extra spring 128 as and for the purposes heretofore set forth. A spring 177 tends to restore the link 176 to normal when the lever 164 is released.

The rearward movement of the division lever 372 will rock plate 373 counterclockwise. This plate is pivoted on shaft 157 and, in the regular operation of division, will cause shaft 157 to be swung clockwise and thus move two-armed lever 383 clockwise so that its lower end will engage stud 174 on the lever 175 previously mentioned thus moving the link 176 as before to operate link 184 and increase the motor load as above described.

The same rearward movement of the division lever 372 will rock shaft 157 which extends across the machine and has fixed to its other end (Fig. 2) a lever 384 the outer end of which carries a stud 387 riding in a slot in a link 388 extending downwardly and having a slot in its lower end which engages a stud 163 in the right arm 155 of the previously mentioned three-armed element to which is connected the link 138 above mentioned. This action will thus also start the motor whenever the division lever 372 is actuated.

It is therefore clear that, when multiplying and dividing operations are initiated, the motor is started and the load on the motor governor is increased whereby the motor achieves a higher speed during these operations before its control switch is momentarily opened as above explained.

What is claimed as new is:

1. In a calculating machine of character described wherein certain operations such as multiplication and division are to be performed, the combination of a high speed universal motor, a motor control switch, said switch comprising a pair of superposed contacts, one of said contacts having an extended spring member, a push rod movable to engage said extended spring member to open said contacts, a speed governor operated by said motor, a bail member connected to and rocked by said governor, an arm on said bail member and engaging said rod, a spring associated with said bail member to resist its movement by the governor, a stud projecting from said bail member, an arm disposed adjacent said stud, a second bail member on which said last mentioned arm is fixed, a shaft to which said second bail member is pivoted, a second spring associated with said shaft and engaging said second bail member to urge the arm fixed thereon into contact with the stud, an element actuated when multiplication or division is to be performed, said element having an operative and inoperative position, an ear on said element, a finger on said second bail member adapted to be engaged by said ear when said element is in its inoperative position to hold the second bail member, against the action of its spring, in a position whereby its arm is held out of contact with the stud, said ear being disengaged from the finger when the element is moved to its operative position to allow the spring on said second bail member to effect the movement of its arm to engage the stud and add the resistance of the second spring to that of the first spring in opposing the movement of the first bail member whereby the motor may attain a higher speed before the switch contacts are opened.

2. A calculating machine including a high speed universal type motor adapted to be operated at different speed levels depending on the calculating operation being performed comprising a motor control switch, said switch comprising a pair of contacts superimposed one above the other, one of said contacts having an extended spring member, a reciprocable push rod engaging the extended spring member, governor means driven by said motor and actuating said push rod at a predetermined speed level of the motor to separate the switch contacts, first spring means to oppose the action of said governor means on said push rod and thereby fix the predetermined speed level of the motor, and a manually operable mechanism for adjusting the speed of the motor during certain machine operations, said mechanism including an operator for a second spring means for increasing the opposition to the governor means offered by said first spring to thereby automatically determine a second and higher speed level for said motor, said second spring means being normally inactive and being added to the effectiveness of said first spring upon actuation of said operator.

3. A calculating machine including a high speed universal type motor adapted to be operated at different speed levels depending on the calculating operation being performed comprising a motor control switch, a centrifugal governor operated by said motor, a first linkage connecting the governor with the switch, a push rod operated by said linkage to open said switch, first spring means connected to said linkage and adapted to oppose the opening of said switch by the governor below a predetermined first speed level, a manually operable mechanism for adjusting the speed of the motor when a special machine operation is to take place, a second linkage connected with said mechanism and engageable with the first linkage, second spring means connected to the second linkage and tending to move said second linkage into engaged position with the first linkage to add to the effect of said first spring means in resisting the movement of the first linkage under the influence of the governor and thereby determine a second and higher speed level for the motor, and means on the second linkage and engaged by said mechanism when said mechanism is in inactive position to prevent said second linkage and said second spring means from adding to the effect of said first linkage on said governor.

References Cited in the file of this patent

UNITED STATES PATENTS 2,541,120      Sparklin _____ Feb. 13, 1951